9575X
R. Skinner,
Horse Power.
Patented Mar. 31, 1836.
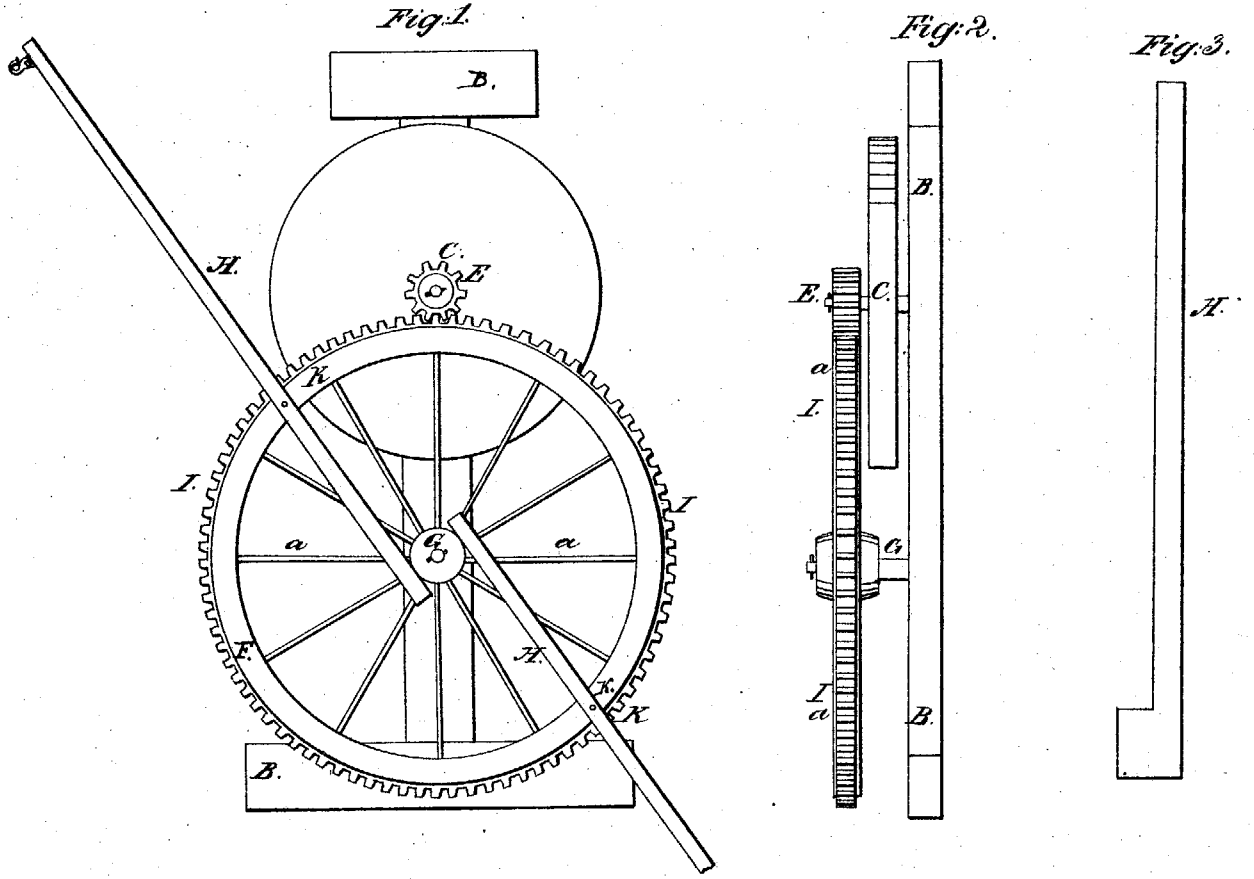
AM. PHOTO-LIT'HO. CO. N.Y. (OSBORNE'S PROCESS)

95754 Mar. 31, 1836 Ar 1st 401.

Richard Skinner, Williamson N.Y.

Letters Patent.

The schedule referred to in these Letters Patent and making a part of the same, containing a description in the words of the said Richard Skinner himself of his improvement in horse power for threshing machines.

To all persons to whom these presents shall come; Richard Skinner of the town of Williamson in the County of Wayne and State of New York sends greeting: Be it known that I the said Richard Skinner have invented a new and useful improvement not known or used before in the making of horse power for threshing machines which invention and the manner of using it is as follows viz. The improvement invented is a hub and axletree for the [illegible] main wheel instead of the shaft and journals or gudgeons in common use with screws or [illegible] fastened to the hub and to the ring of the main wheel: also a pinion cast in the form of a pipe with a sufficient length to unite with the band wheel and to operate in the same way as the hub on the main wheel – the band wheel to be fastened to the pinion. The pinion and hub turn on cast iron axletrees that are made fast in the foundation or bed piece.

In witness whereof I have hereunto subscribed my name the 12th day of February in the year 1836.

Witnesses
Theron H. Strong
Abner H. Lakey

Richard Skinner 242 ho7 Drawing

Ex? ckd.